United States Patent [19]
Ogi

[11] Patent Number: 5,901,324
[45] Date of Patent: May 4, 1999

[54] PARALLEL PROCESSOR SYSTEM FOR TRANSMITTING DATA IN SMALL BUFFERS

[75] Inventor: Yoshifumi Ogi, Kawasaki, Japan

[73] Assignee: Fujitsu Limited, Kawasaki, Japan

[21] Appl. No.: 08/724,428

[22] Filed: Oct. 1, 1996

Related U.S. Application Data

[63] Continuation of application No. 08/389,481, Feb. 16, 1995, abandoned.

[30]     Foreign Application Priority Data

Mar. 14, 1994  [JP]  Japan ................................... 6-042104

[51] Int. Cl.$^6$ .................................................. G06F 15/80
[52] U.S. Cl. ............................... 395/800.28; 395/800.01; 395/800.02; 395/800.04; 395/800.16; 395/200.31; 707/1
[58] Field of Search .................... 395/200.31, 800.01, 395/800.02, 800.04, 800.16, 800.28; 707/1

[56]            References Cited

U.S. PATENT DOCUMENTS 5,293,164  3/1994  Bugajski et al. ........................ 341/51
5,301,337  4/1994  Wells et al. ............................. 395/800

FOREIGN PATENT DOCUMENTS

5-28122   2/1993  Japan.
5-342178  12/1993  Japan.

Primary Examiner—Alyssa H. Bowler
Assistant Examiner—John Follansbee
Attorney, Agent, or Firm—Staas & Halsey

[57]            ABSTRACT

In a parallel processor system, each processor is connected to a secondary memory. A main memory of a sender processor has first small buffers and a main memory of a receiver processor has second small buffers. The sender processor divides data correspondingly to destinations and transmits the data to receiver processors through the first small buffers. Each receiver processor further divides the received data, stores the divided data in a bucket storage region in the secondary memory, and performs a designated process. Since data is divided in two stages, with a very reduced number of small buffers, bucket tuning process can be performed.

15 Claims, 10 Drawing Sheets

WHEN ACCESSED WITH OUTPUT VALUE OF GROUPING FUNCTION AS WORD ADDRESS, CORRESPONDING RECEIVER PROCESSOR NUMBER CAN BE OBTAINED.

FIG. 7

```
1, 111,  75  → BUCKET B1 → PROCESSOR A1
2,  22, 122  → BUCKET B2 → PROCESSOR A2
      .           .             .
      .           .             .
```

FIG. 8

WHEN ACCESSED WITH OUTPUT VALUE OF GROUPING FUNCTION AS WORD ADDRESS, CORRESPONDING INTERMEDIATE BUCKET IDENTIFIER CAN BE OBTAINED.

FIG. 9

| GROUPING FUNCTION VALUE | LOCAL BUCKET IDENTIFIER |
|---|---|
| 1 | L1 |
| 111 | L2 |
| 75 | L3 |

FIG. 10

PARALLEL PROCESSOR SYSTEM FOR TRANSMITTING DATA IN SMALL BUFFERS

This applicaiton is a continuation of application No. 08/389,481, filed Feb. 16, 1995, now abandoned.

BACKGROUND OF THE INVENTION

1. Field of the Invention

The present invention relates to a parallel processor system having a plurality of processors connected to respective secondary memory devices such as magnetic disk devices connected through a network so as to perform one process as a system, in particular, to an inter-processor data division system for equalizing data processed in each processor that composes a parallel processor system.

2. Description of the Related Art

The parallel processor systems are categorized as a data sharing system and a data distributing system. In the data sharing system, each process in the system can freely access data stored in, for example, a plurality of magnetic disk devices through a switch. On the other hand, in the data distributing system, dedicated secondary memory devices are connected to respective processors and the processors exchange data through the network.

Figure 1:
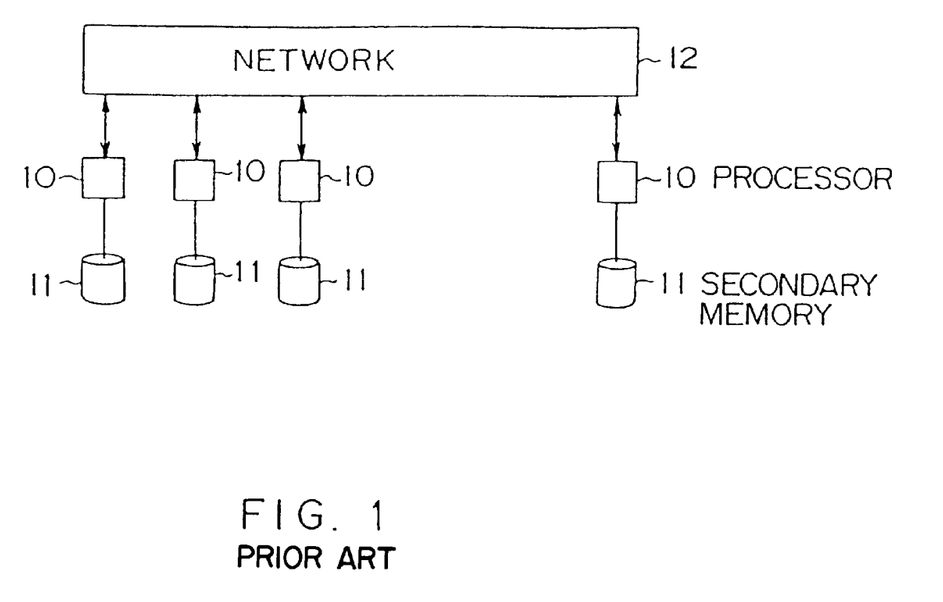
FIG. 1 is a block diagram showing the construction of a data distributing type parallel processor system.

FIG. 1 is a block diagram showing the construction of a data distributing type parallel processor system. In FIG. 1, dedicated secondary memory devices (for example, magnetic disk devices 11) are connected to processors 10 that compose the system. The processors 10 exchange data therebetween through a network 12.

Next, hash-join in a database process of the data distributing type parallel processor system shown in FIG. 1 will be described. The hash-join is an algorithm that is referred to as equivalent-join.

In FIG. 1, the contents of a first table R and a second table S of a database are distributively stored in the magnetic disk devices 11. In the table R, identification numbers of employees and the names of the employees corresponding to the identification numbers are stored. In the table S, the identification numbers of the employees and the annual incomes of the employees are stored. In this case, the equivalent-join process is a process for retrieving the contents of the tables R and S and generating a third table that stores pairs of the names of the employees and the annual incomes of the employees with keys of the identification numbers of the employees. The hash-join is an equivalent-join that is performed in a data distributing type parallel processor system. In this process, the identification numbers are categorized as a plurality of groups. Each processor transmits data of the same group, namely the contents of the table R and the table S, to a processor that performs the equivalent join-process for the data of the group. After all data of the group has been transmitted, the processor performs the equivalent-join process.

Next, the hash-join process will be described with steps 1 to 4.

Step 1: Each processor (processor number 0 to $N_{pe}-1$) reads data that is logically treated as one block (this data is referred to as a record or table), applies a predetermined grouping function for the data, and determines a processor that processes the data.

Step 2: Each processor transmits the data to the determined processor.

Step 3: After the above steps have been performed for all data, each processor receives data to be internally processed.

Step 4: Each processor independently performs the join process.

In each processor, the same grouping function should be used. In addition, corresponding to the same data value, the same value should be returned. When data is transmitted between processors, a data group with the same output value of the grouping function should be transmitted to the same processor.

Thus, since data with the same data value is transmitted to the same processor, a data process with the same data value can be executed in the designated processor as a closed process.

However, in the above-described process, if the distribution of the output values of the grouping function largely deviates (namely, if only a particular processor transmits a large amount of data, the operation performance of this processor becomes a bottle neck), the performance of the entire system deteriorates.

For example, if the names of employees are stored in the two tables R and S and the names are grouped with a key of family names, since data amount of groups for typical family names such as SUZUKI and TANAKA, which are typical Japanese family names, is larger than that of other groups. Thus, the load of the processor that processes the data of such groups becomes large, thereby deteriorating the performance of the entire system. To prevent the performance from being deteriorated, a bucket tuning process is performed.

A bucket is a block of data grouped corresponding to, for example, identification numbers. In the bucket tuning process, a grouping function is properly selected so as to remarkably decrease the size of the buckets. In addition, one processor processes data of a plurality of buckets so as to equalize the total data of buckets processed by each processor in the parallel processor system. This process is performed with steps 11 to 14.

Step 11: The types of the output values of the grouping function should be remarkably larger than the number of processors. More practically, a block of data groups with the same output values of the grouping function is referred to as a sub-bucket. A grouping function is selected so that the size of the largest sub-bucket is satisfactorily smaller than the value of the total data amount divided by the square of the number of processors. All sub-buckets with the same output values of the same grouping function collected from all the processors in the system compose a bucket.

Step 12: The grouping function is applied for all data so as to determine the size of each sub-bucket.

Step 13: A combination of sub-buckets is considered so that the process data amount of each processor is equalized. To do that, a combination of sub-buckets is stored. (When a particular processor combines a sub-bucket B and a sub-bucket C and transmits the combination of these sub-buckets to a processor D, all processors should combine the sub-bucket B and the sub-bucket C and transmit the combination of these sub-buckets to the processor D. Thus, the above-described evaluation is performed corresponding to the information of the size of each sub-bucket by each processor.

Step 14: When a real data process is performed, each processor combines sub-buckets corresponding to the above-described information and transmits the combination of these sub-buckets to another processor. When data with the same values of a grouping function is transmitted to a processor, this data is referred to as a bucket.

In step 14, each processor provides a plurality of data buffers corresponding to buckets in the main memory. While generating data (for example, data is being read from a secondary memory), each processor applies a grouping function for the data, evaluates the data (namely, divides the data into sub-buckets), and stores the sub-buckets in corresponding data buffers. When the data storage amount stored in each data buffer exceeds a predetermined threshold value, the processor transmits the content of the data buffer (namely, part of the bucket) to a corresponding processor.

The reason why the data buffering process is performed is in that an inter-processor transmission means has a large overhead that is irrespective of the data amount. To prevent the transmission performance from being deteriorated, a definite amount of data should be transmitted at a time.

Generally, the storage capacity of the main memory of one processor in the parallel processor system is remarkably smaller than the value of the total amount of data processed in the system divided by the number of processors (namely, the total amount of data transmitted to one processor as a combination of buckets). To speed up the above-described hash-join process, data being grouped should be stored in the main memory. In other words, a bucket should be stored in the main memory. Due to decrease of memory cost, a set of data blocks can be stored in the main memory and the data can be processed at high speed. Next, as a related art reference, a practical processor system in which buckets are generated so that one group of data is stored in the main memory and processed in each processor will be described in detail.

Figure 2:
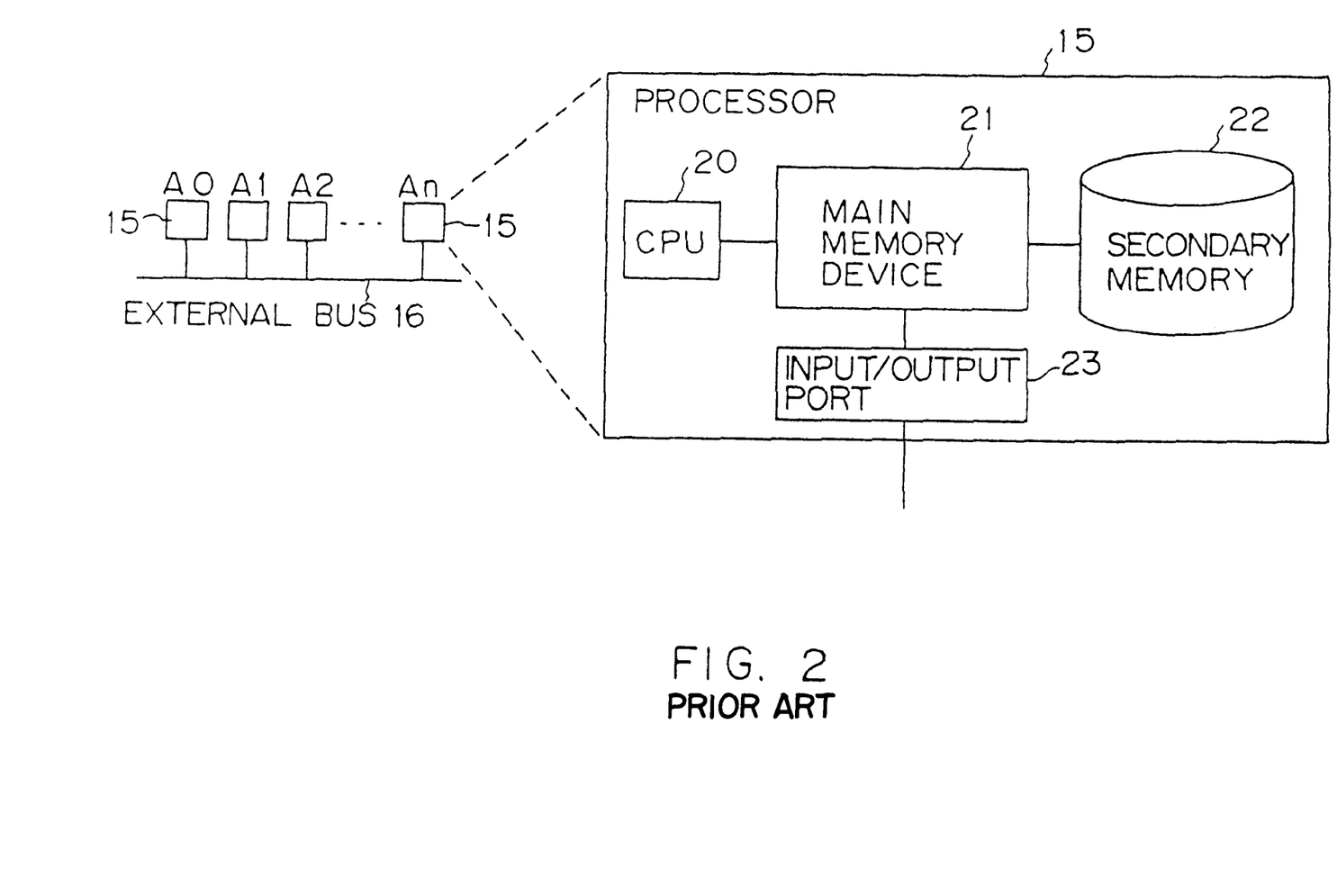
FIG. 2 is a block diagram showing the construction of each processor of a parallel processor system.

FIG. 2 is a block diagram showing a construction of a parallel processor system. In FIG. 2, (n+1) processors 15 (A0 to An) are connected to each other through an external bus 16. Each processor 15 comprises a CPU 20, a main memory device 21, a secondary memory 22, and an input/output port 23. The input/output port 23 inputs and outputs data between the main memory device 21 and the external bus 16. Next, data transmission performed between two processors will be described.

Figure 3:
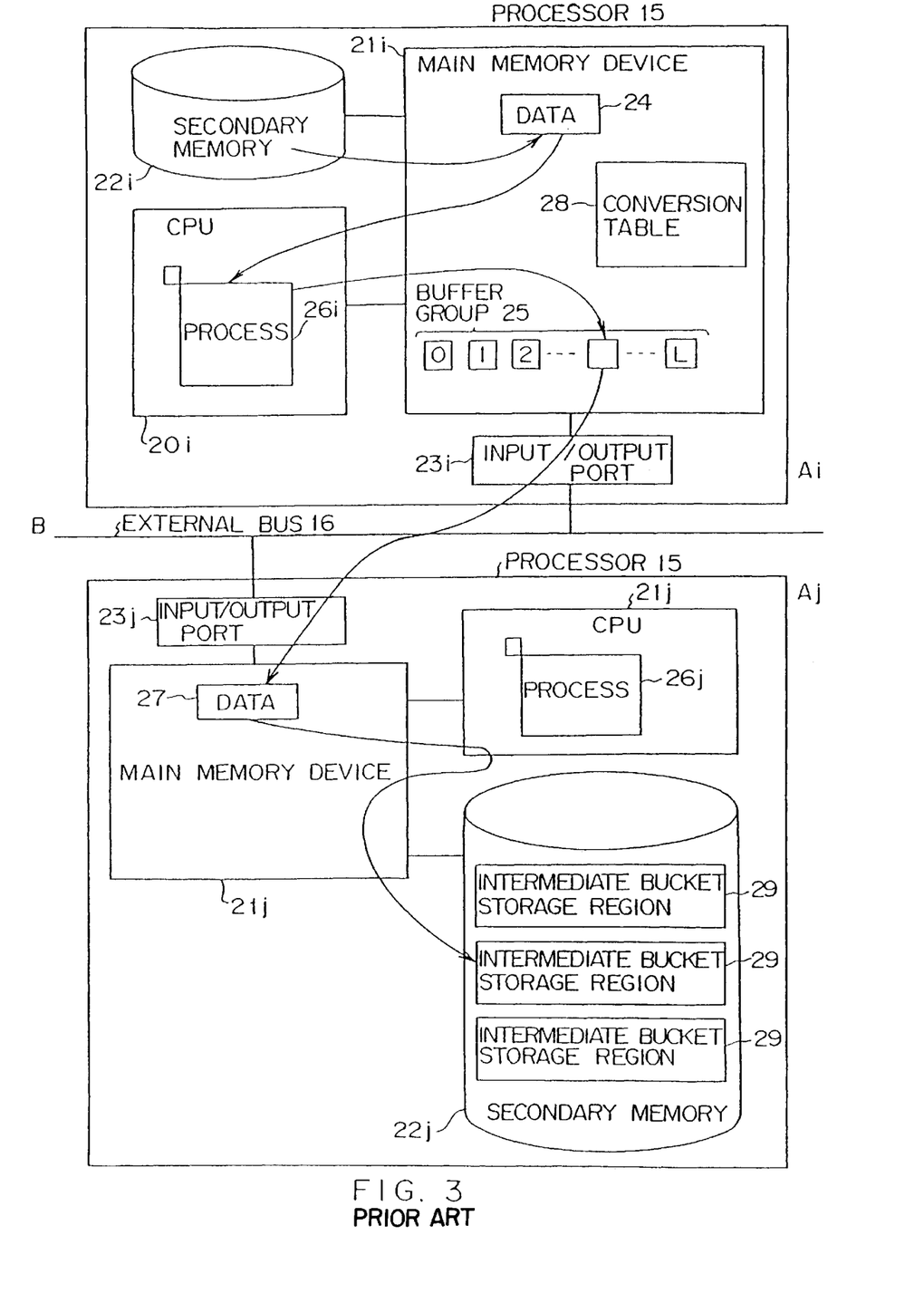
FIG. 3 is a block diagram for explaining an inter-processor data transmission according to a related art reference.

FIG. 3 is a block diagram for explaining a related art reference of data transmission performed between two processors. Referring to FIG. 3, data transmission performed from a processor Ai to a processor Aj will be described. Reference numeral 24 is data that is read from a secondary memory 22i of the processor Ai. The data is for example one record. Reference numeral 25 is a buffer group 25 that temporarily stores the data 24 before transmitting the data 24 to another processor (in this example, Aj). Reference numerals 26i and 26j are processors that perform respective data transmission processes. Reference numeral 27 is data that is transmitted from the processor Ai. Reference numeral 28 is a conversion table that is an intermediate bucket storage region for determining to which buffer of the buffer group 25 the data 24 read from the secondary memory 22i is stored. Reference numeral 29 is a region of the secondary memory 22j that stores transmitted data in the processor Aj.

In FIG. 3, on the processor Ai side, the process 26i applies a grouping function for the data 24 read from the secondary memory 22i so as to group the data. A bucket that includes the data depends on the value of the grouping function. In addition, a processor to which the data is transmitted is determined. Information about in which bucket data is included and to which processor the data is transmitted has been determined by a parent processor (not shown) or one of the processors 15 shown in FIG. 2 as a combination of buckets so that the load of each processor is equalized by preliminary reading the data from all the processors. The result is stored in the conversion table 28.

Figure 4:
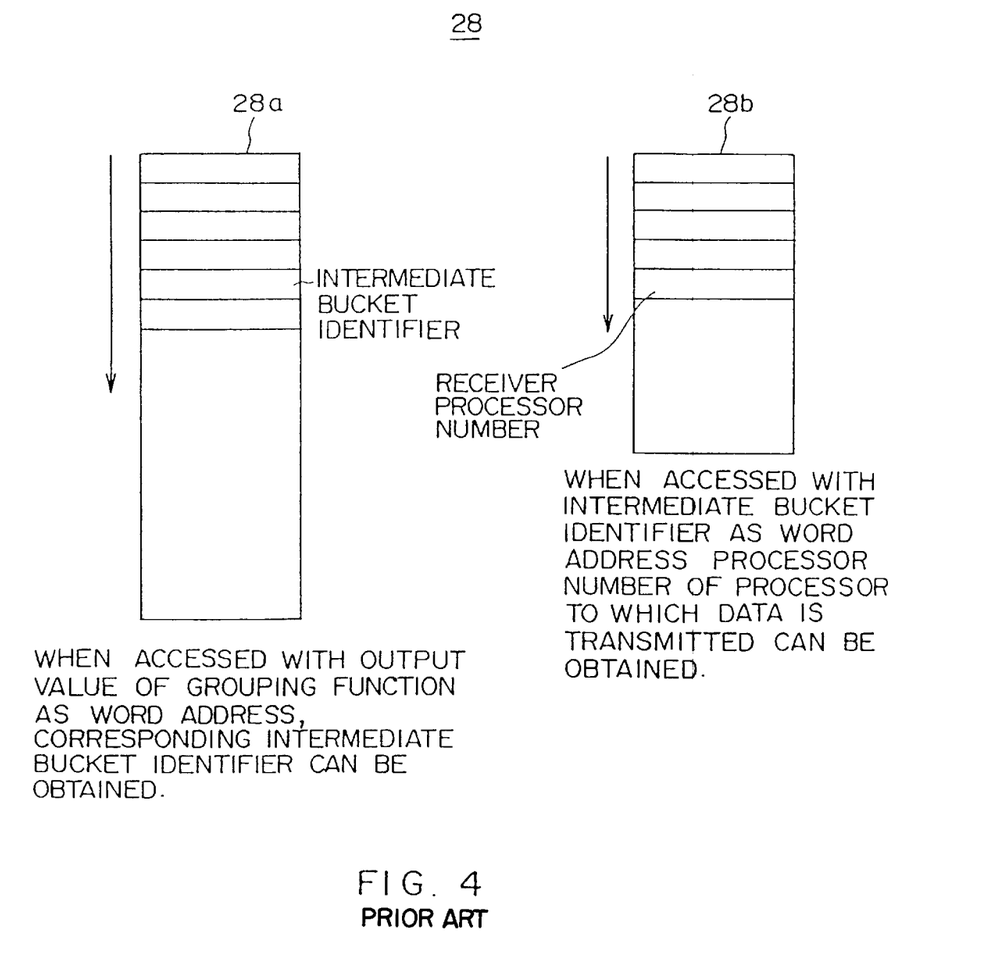
FIG. 4 is a schematic diagram showing a conversion table used for transmitting data according to the related art reference.

FIG. 4 is a schematic diagram showing a conversion table in a sender processor corresponding to a related art reference. In FIG. 4, reference numeral 28 is a conversion table. The conversion table 28 is composed of a conversion table 28a and a conversion table 28b. The conversion table 28a is used to obtain an intermediate bucket identifier that represents the relation between the output values of the grouping function and the intermediate buckets. On the other hand, the conversion table 28b is used to obtain the receiver processor number of a receiver processor to which the data is transmitted corresponding to the intermediate bucket identifier. The intermediate bucket is data that is transmitted to receiver processors before they are grouped as a final bucket. The intermediate bucket is equivalent to a sub-bucket of a sender processor.

There are many grouping functions applicable for the data 24. When data is an integer and the number of (intermediate) buckets that is the number of groups as the result of the grouping process for all data in the system is M, a remainder operation with a prime number that exceeds 5 M can be used as a grouping function.

When the number of (intermediate) buckets that are present in the system is M, the buffer group 25 is composed of at least larger than M (namely L+1) small buffers. Generally, to allow data to be stored in the buffer group 25 while the buffer group 25 is transmitting data to another processor, double buffering process is performed. Thus, the number of small buffers, (L+1), is larger than twice the number of buckets, 2 M.

The data 24 that is read from the secondary memory 22i on the processor Ai side is stored in a small buffer in the buffer group 25 corresponding to a bucket in which the data should be included. When the data storage amount of the small buffer exceeds a predetermined threshold value A, the data stored in the small buffer is transmitted to a processor where the intermediate bucket is transmitted. In this case, the processor is Aj. The transmitted data 27 is stored in the region 29 of the secondary memory 22j by the process 26j. With all intermediate buckets transmitted from all other processors, a final bucket is composed.

As described above (in FIGS. 2 to 4), in the conventional system, data to be transmitted to another processor is stored in a small buffer of the buffer group 25 and transmitted to the processor that processes the bucket. Since the number of small buffers becomes very large, they occupy most part of the main memory.

As described above, the storage capacity of the main memory of the processor is generally very small in comparison with the value of the total data amount handled in the system divided by the number of processors. In addition, the number of buckets that are present in the system is very large. Since the order of data that is read from the secondary memory cannot be predicted, the number of small buffers should be larger than the number of buckets that will be generated. In addition, the storage capacity of each buffer should be larger than a threshold value A that depends on the overhead of the data transmission performed between processors.

Although buckets that will be generated may be determined by a preliminary reading process, it is substantially impossible to store the determined result and reflect the result to the buffer management.

The number of buckets that are present in the system is equal to the value of the total data amount divided by the storage capacity of the main memory of each processor. Thus, in FIG. 3, the storage capacity of the buffer group 25, which temporarily stores the transmitted data to another processor, should be larger than the value given by the following expression.

$$A \times \text{total data amount/storage capacity of main memory of processor} \quad \ldots (1)$$

where A is a threshold value for transmitting at a time data stored in one small buffer of the buffer group 25.

When the threshold value A is 64 KB, the total data amount is 64 GB, and the storage capacity of the main memory is 64 MB, the value obtained by the expression (1) becomes 64 MB. Thus, the buffer group 25 uses all the storage capacity of the main memory. In reality, it is impossible to accomplish such a system. The storage capacity of the buffer given by the expression (1) is required for each processor in the system. Thus, it is impossible to accomplish a parallel processor system that satisfies such a requirement.

SUMMARY OF THE INVENTION

An object of the present invention is to accomplish a parallel processor system that allows the size of buckets to be reduced to the size of the storage capacity of the main memory and to prevent the main memory from being wastefully used.

The parallel processor system according to the present invention comprises a plurality of processors and a network. The processors are connected to respective secondary memories. The network connects the processors of the system. Each processor has a main memory that contains a first conversion table, a second conversion table, first small buffers (first data memory portion), and second small buffers (second data memory portion). The number of the first small buffers is at least larger than the number of processors. The number of the second small buffers is at least larger than the number of buckets processed by one processor.

When the parallel processor system performs a parallel process, each processor retrieves data to be processed from its secondary memory and transmits the data to another processor that processes the data. A receiver processor stores the received data in a bucket storage region in its secondary memory and performs a designated process.

A sender processor applies a first grouping function for the data and retrieves a processor number of a processor that processes the data from the first conversion table corresponding to the result of the first grouping function. The first conversion table has a plurality of values of the first grouping function corresponding to each processor number. The sender processor stores the data in a first small buffer corresponding to the data. When the data storage amount of the small buffer exceeds a predetermined threshold value, the sender processor transmits the data to a processor with the number.

The receiver processor applies a second grouping function for the data received from another processor and retrieves an identifier of a bucket or a local intermediate bucket from the second conversion table corresponding to the result of the second grouping function. The receiver processor stores the data in a second small buffer corresponding to the identifier. When the data storage amount of the small buffer exceeds a predetermined threshold value, the receiver processor stores the data in a bucket storage region in its secondary memory.

Thus, since the sender processor transmits data to each receiver processor without identifying buckets, the number of the first small buffers used for transmitting data can be reduced. The receiver processor divides the received data for each bucket corresponding to the second grouping function and the second conversion table and stores the data in the second small buffer. The divided data in the second small buffer is stored in a corresponding bucket storage region. Since data is divided in two stages, the bucket tuning process can be performed with a very reduced number of small buffers. Thus, the main memory can be effectively used.

These and other objects, features and advantages of the present invention will become more apparent in light of the following detailed description of a best mode embodiment thereof, as illustrated in the accompanying drawings.

DESCRIPTION OF PREFERRED EMBODIMENT

Figure 5:
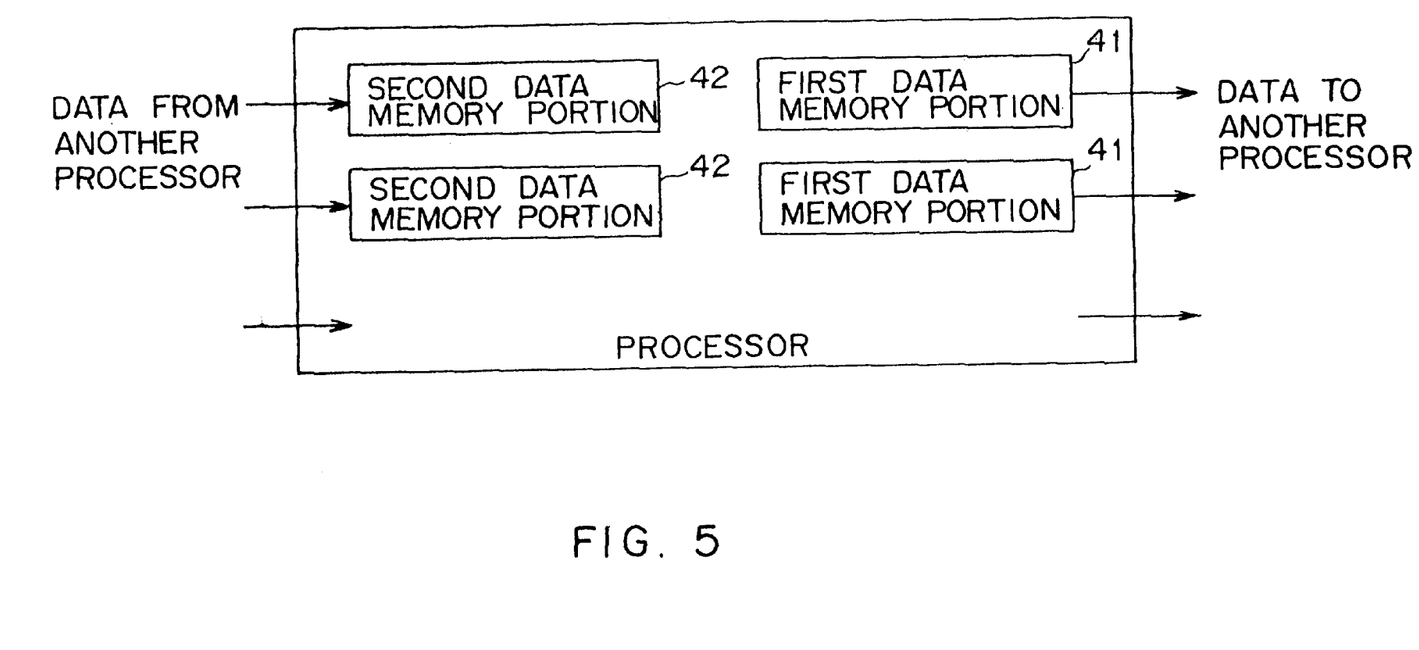
FIG. 5 is a block diagram showing a theoretical construction according to an embodiment of the present invention.

Next, with reference to the accompanying drawings, an embodiment of the present invention will be described. FIG. 5 is a block diagram showing the theoretical construction according to the embodiment of the present invention. FIG. 5 shows the theory of a parallel processor system that transmits data between processors while generating data to be transmitted from a local processor to a remote processor and performs a process corresponding to data being transmitted.

In FIG. 5, a plurality of first data memory portions 41 are disposed in each processor of the parallel processor system. The first data memory portions 41 temporality store data to be transmitted to a plurality of processors. The first data memory portions 41 are composed of, for example, small buffers.

In addition, a plurality of second data memory portions 42 are disposed in each processor. Each of the second data memory portions 42 stores data which are transmitted from another processor of the system and divided into process segments (for example, buckets) in each processor. As with the first data memory portions 41, the second data memory portions 42 are composed of small buffers.

The first data memory portions 41 and the second data memory portions 42 are formed in, for example, a main memory of each processor.

In the present invention, data to be transmitted to another processor is primarily stored in a small buffer corresponding to a receiver processor. Thereafter, when the data storage amount of the small buffer exceeds a predetermined threshold value, the data stored therein is transmitted to the receiver processor. As described above, data to be transmitted to a processor is divided into a plurality of buckets so as to equalize the process amount of each processor. However, according to the present invention, data is transmitted without distinguishing these buckets.

In a sender processor, to determine a receiver processor, for example, a first grouping function is employed. Data for the receiver processor of which has been determined is stored in a first data memory portion 41 corresponding to the receiver processor. When the data storage amount of the first data memory portion 41 exceeds a predetermined threshold value, the data stored therein is transmitted to the receiver processor.

The receiver processor applies a second grouping function for the transmitted data, divides the received data into intermediate buckets, and stores the intermediate buckets into small buffers, which compose the second data storage portions 42, corresponding to the intermediate buckets. When the data storage amount of each buffer exceeds a predetermined threshold value A', the data is stored in a region of a secondary memory in which the intermediate bucket is stored and combined into a final bucket.

Thus, according to the present invention, in the sender processor, data to be transmitted is stored in a small buffer corresponding to a receiver processor without distinguishing buckets.

Figure 6:
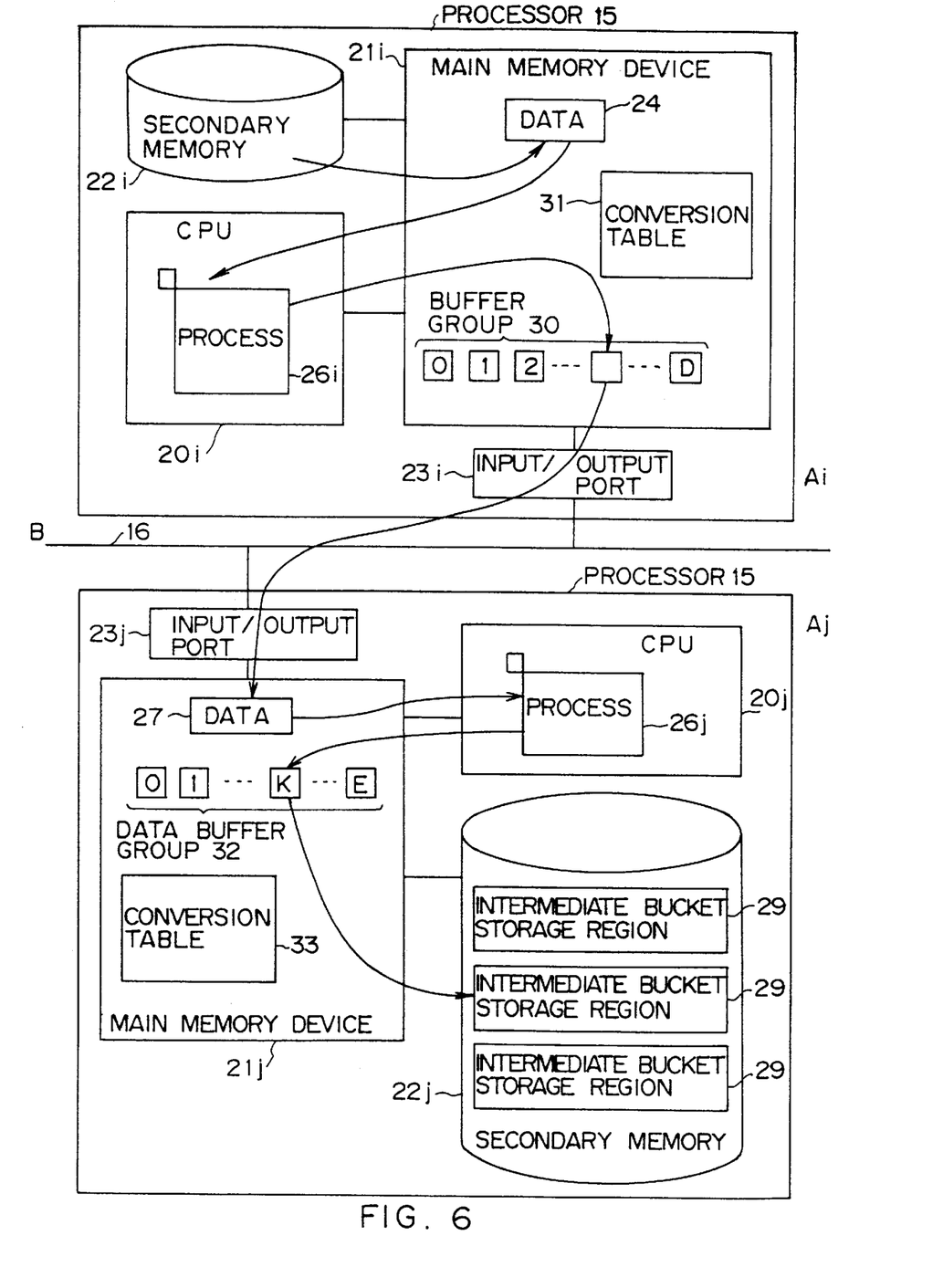
FIG. 6 is a block diagram for explaining an inter-processor data transmission according to the embodiment.

FIG. 6 is a block diagram for explaining an inter-processor data transmission according to the embodiment of the present invention. In FIG. 6, the same portions as those shown in FIG. 3 are denoted by the same reference numerals. Focusing on portions that are different from those in the related art reference shown in FIG. 3, the data transmission will be described.

In a sender processor A$i$, as a data buffer group 30 that temporarily stores data to be transmitted, small buffers corresponding to the number of processors in the parallel processor system are formed.

Unlike with the conversion table 28 shown in FIG. 3, a conversion table 31 is used to determine a receiver processor corresponding to an output value of a grouping function.

Figure 7:
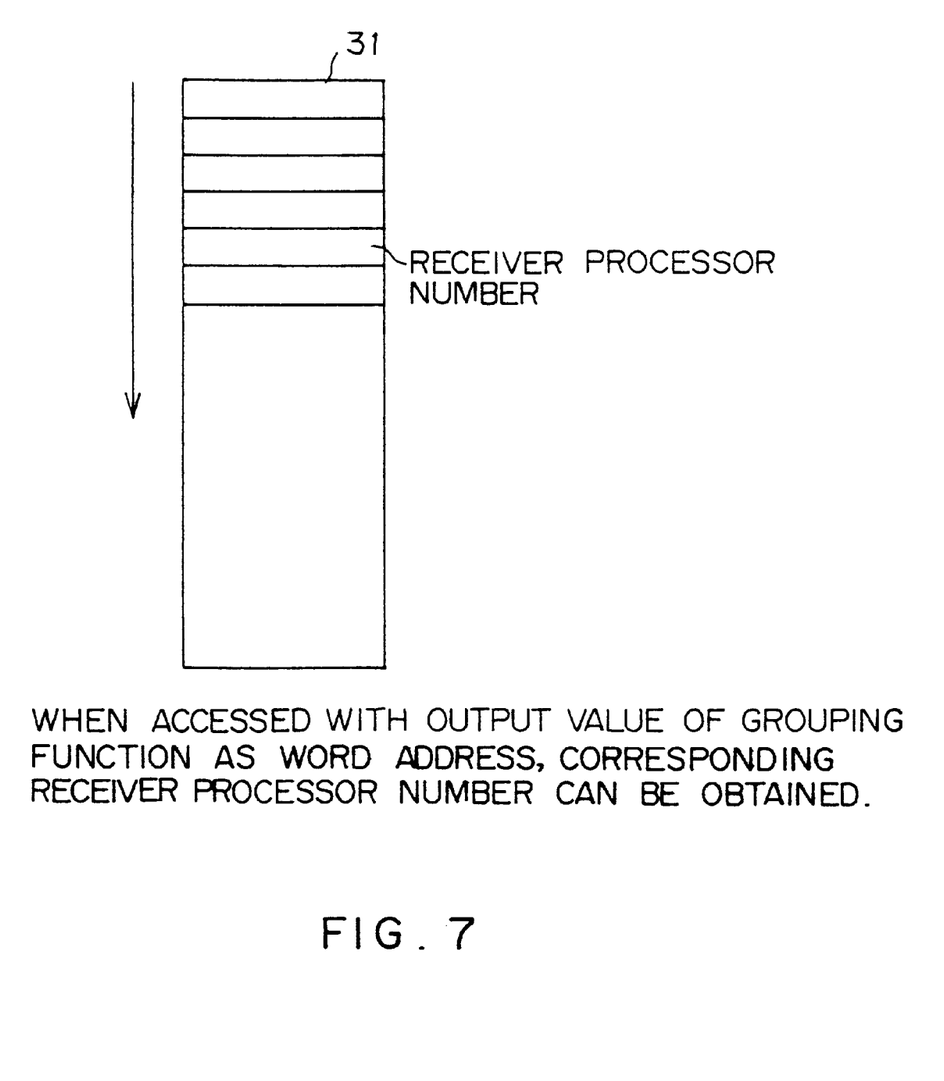
FIG. 7 is a schematic diagram showing an example of a conversion table used for transmitting data.

FIG. 7 is a schematic diagram showing the conversion table 31 according to the embodiment of the present invention. With this table, the output value of the grouping function is converted into a receiver processor number.

Figure 8:
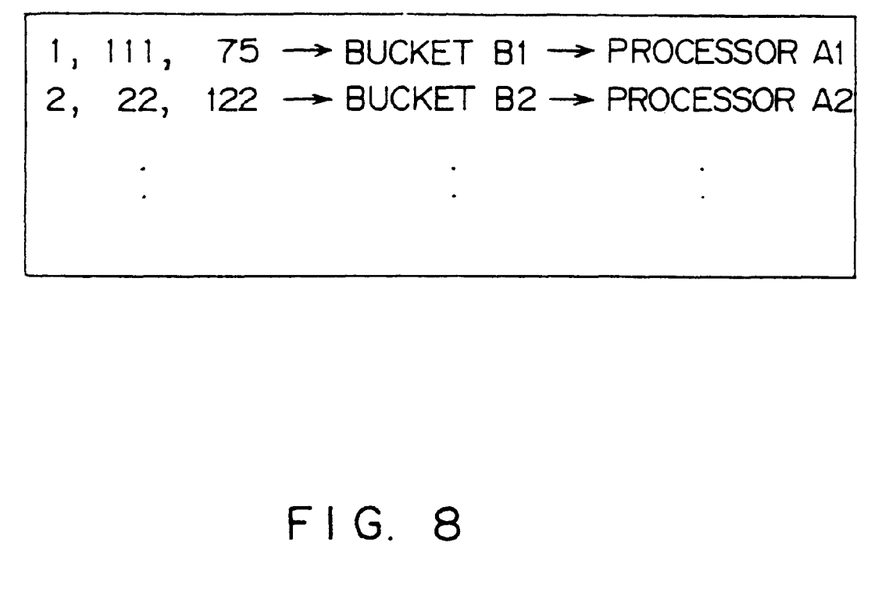
FIG. 8 is a schematic diagram for explaining the Content stored in the conversion table of FIG. 7.

FIG. 8 is a schematic diagram for explaining the conversion table 31 of FIG. 7 in detail. In FIG. 8, output values such as 1, 111, and 75 of the grouping function are transmitted to a processor A1. Referring to FIG. 8, the group of these values is a bucket B1. In addition, data with output values 2, 22, and 122 of the grouping function is grouped to a bucket B2 and transmitted to a processor A2. Unlike with the related art reference, in this embodiment, three output values rather than one output value of a grouping function correspond to one bucket.

In FIG. 6, a process 26$i$ applies a grouping function for data 24 that is read from a secondary memory 22$i$ on the sender processor A$i$ side. As with the related art reference shown in FIG. 3, the content of the conversion table 31 has been set so that the loads of all the processors are equalized upon completion of data transmission. A receiver processor to which the data 24 should be transmitted is determined corresponding to an output value of the grouping function. Although the grouping function may be the same as that described in FIG. 3, according to the embodiment, only a receiver processor needs to be determined. Thus, when data is an integer and the number of processors is $N_{pe}$, a remainder operation with a prime number exceeding $5N_{pe}$ can be used as a grouping function.

The data buffer group 30 formed in the sender processor A$i$ accords with the number of processors in the system, $N_{pe}$. The data buffer group 30 is composed of at least larger than (D+1) small buffers, where the value (D+1) is larger than the number of processors. As with the related art reference, two small buffers are provided for each receive processor so as to perform double buffering process. Thus, generally, the value (D+1) is larger than twice the number of processors, namely $2N_{pe}$.

When a receiver processor for the data 24 read from the secondary memory 22$i$ has been determined, the data is stored in a small buffer corresponding to the receiver processor. When the data storage amount of the small buffer exceeds the predetermined threshold value A, the data is transmitted to the receiver processor (in this example, A$j$).

In the receiver processor A$j$, a grouping function is applied for received data 27 so as to determine a bucket that includes the data. In other words, a process 26$j$ on the receiver processor A$j$ applies the grouping function for the transmitted data and stores the received data in a small buffer of the data buffer group 32 corresponding to the output value of the grouping function. The number of the small buffers of the data buffer group 32 is the order of the quotient obtained by dividing the number M of buckets that are present in the system by the number of processors.

The grouping function used on the receiver processor A$j$ side may be the same as or different from that used on the send processor side. The grouping function does not identify a receiver processor to which data is transmitted, but an (intermediate) bucket that includes particular data. In most cases, the grouping function used on the receiver processor side is different from that used on the sender processor side. When data is an integer and the number of buckets that are present in the system is M, a grouping function may be a remainder operation with a prime number that exceeds 5 M.

Figure 9:
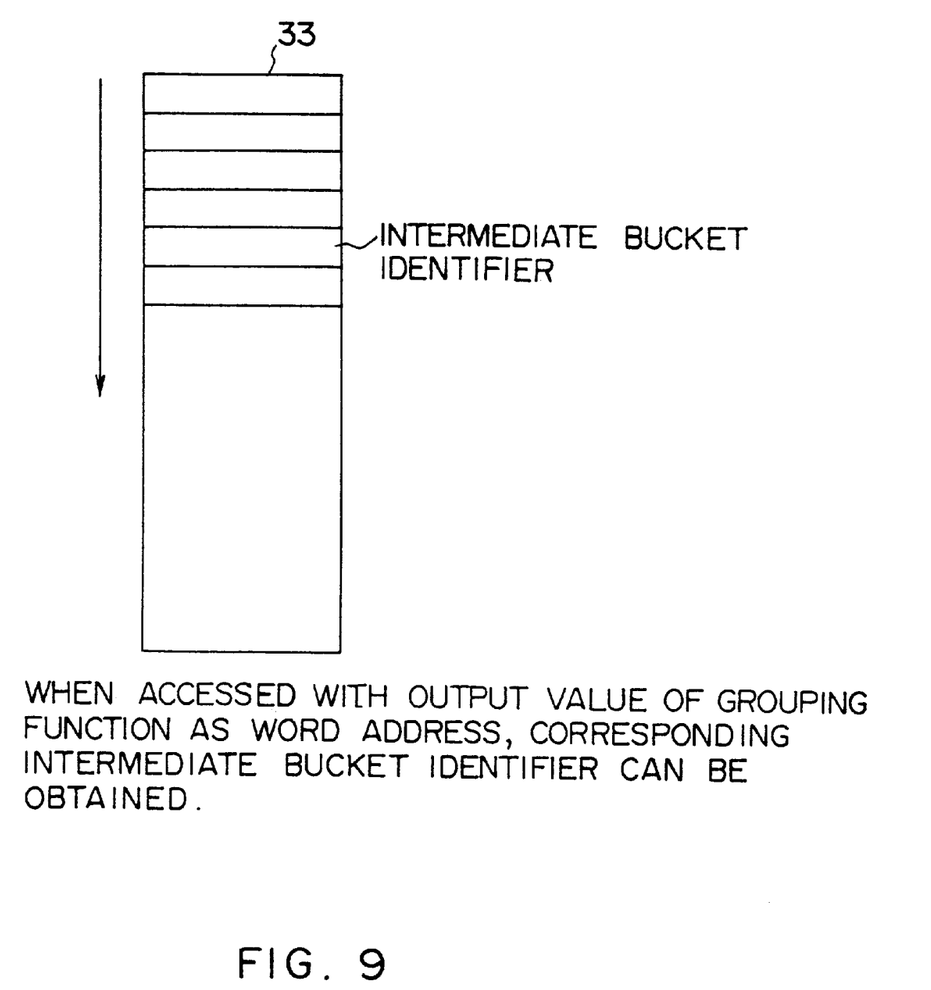
FIG. 9 is a schematic diagram showing a conversion table for dividing transmitted data into buckets.

An (intermediate) bucket that includes data is determined corresponding to an output value of the grouping function. The received data is temporarily stored in a small buffer of the data buffer group 32 corresponding to the bucket. The bucket is determined corresponding to the content stored in the converting table 33. FIG. 9 is a schematic diagram for explaining the conversion table 33. In FIG. 9, the converting table 33 is accessed with an output value of the grouping function as a word address so as to obtain an identifier of an intermediate bucket corresponding to the output value. The number of buckets transmitted to one processor is the order of the value of the total number M of buckets that are present in the system divided by the number of processors, $N_{pe}$. The identifier of the intermediate bucket obtained from the table shown in FIG. 9 may be an identifier of a local intermediate bucket that can identify only a bucket processed in the processor. On the other hand, according to the related art reference shown in FIG. 4, an identifier of an intermediate bucket obtained from the table 28$a$ is used to identify a bucket in the entire system. In other words, the identifier in FIG. 4 is a global intermediate bucket identifier.

Next, with reference to an example, the reason why the conversion table 33 is used will be described. For example, when a conventional hash function is used as a grouping function, most input data may be a text with a variable length (part of data). The output data may be a binary value of around 32 bits. Since a 32-bit binary value can represent 0 to 4 G, if the output value is used as a bucket identifier and the bucket identifier is used as an address of an arbitrary internal control table, the control table should have 4 G regions. On the other hand, an objective of the use of the hash function is to divide input data into at most several hundred groups to several million groups (although the number of real groups depends on the objective of the process). Thus, substantially, it is meaningless to provide regions that exceed the number of the groups. When the bucket identifiers range successively from 0 to a non-negative integer that does not exceeds the value of (the number of the expected groups −1), the control table can be wastelessly provided. Thus, although an output value of the grouping function is converted into a bucket identifier with a conversion table or the like, the output value of the grouping function may be used as a bucket identifier itself.

Figure 10:
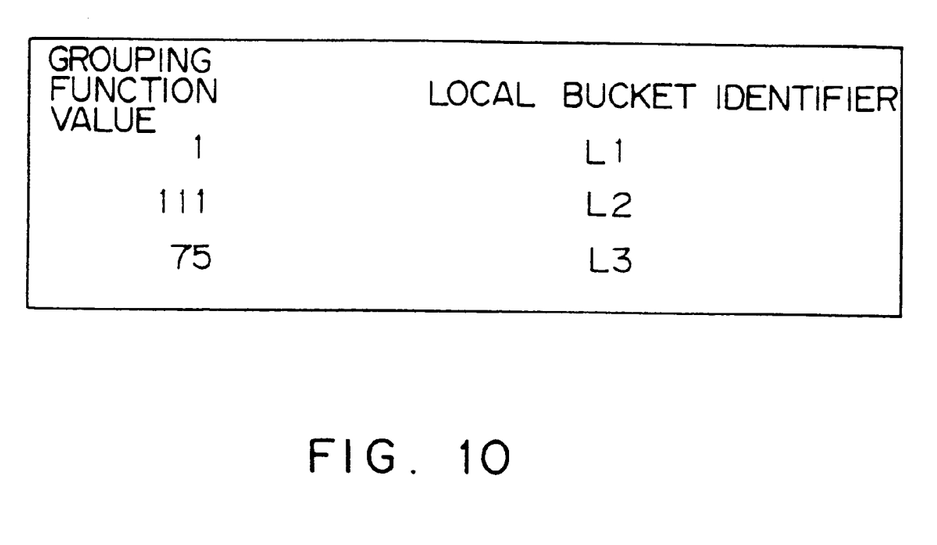
FIG. 10 is a schematic diagram for explaining the content stored in the conversion table of FIG. 9.

FIG. 10 is a schematic diagram for further explaining the conversion table in detail. In FIG. 10, the conversion table has local bucket identifiers corresponding to output values of a grouping function. In FIG. 10, there are three buckets with values 1, 111, and 75 of the grouping function and their corresponding local bucket identifiers L1, L2, and L3.

With the contents of the conversion tables 33 shown in FIGS. 9 and 10, data stored in a small buffer corresponding to each bucket (namely, one small buffer of the data buffer group 32) is transmitted to a secondary memory 22j and stored in a corresponding intermediate bucket storage region 29 when the data storage amount in the small buffer exceeds a predetermined threshold value A'. The threshold value A' is different from the threshold value A of a small buffer on the sender processor side. In other words, the threshold value A' does not depend on the overhead of the communication between processors, but depends on the overhead of accessing to a secondary memory such as a disk device.

In the embodiment shown in FIG. 6, unlike with the related art reference shown in FIG. 3, each processor requires a data buffer group 32 that divides received data and stores the divided data. The number of small buffers that compose the data buffer group 32 is obtained by dividing the total number of buckets that are present in the entire system by the number of processors. When the total number of buckets is 1000 and the number of processors is 64, the number of small buffers is around 16.

To evaluate the system shown in FIG. 6, assume that the entire data amount of the system is 64 GB; the storage capacity of the main memory is 64 MB; the threshold value of the buffer storage amount for transmitting data to another processor, A, is 64 KB; the number of processors is 64; and the threshold value for transmitting data from a small buffer to a secondary memory, A', is 4 KB. In this case, the storage capacity of the buffer group 30 for transmitting data to another processor is at least 4 MB (64 KB×64 processors). The storage capacity for storing data received from another processor is at least 64 KB (4 KB×(64 GB/64 MB)/64 processors). Thus, the total of the storage capacity of these buffer groups 30 and 32 is 4.064 MB. This value is much smaller than 64 MB of the related art reference. In addition, since the segmentation (re-grouping) of the buckets in the receiver processor is executed in the memory, it does not affect the execution speed of the entire process. In other words, since the storage capacity of the buffer group is very small, it can be stored in the main memory device 21. If the storage capacity of the buffer group is too large, it cannot be stored in the real storage space, but needs to be distributed in the secondary memory 22j by a virtual storage system. In FIG. 6, since the storage capacity of the buffer group is small, data to be processed is present in the main memory device 21j with a very high probability (almost 1). In addition, the re-grouping process does not require an input/output process (or a communication process for another processor) with external devices (the secondary memory 22j and another processor). It is not necessary to reflect the updated data to the outside. Thus, the re-grouping process can be executed at high speed.

As described above, according to the present invention, to transmit data, it is necessary to designate only receiver processors. Thus, the buffer storage capacity for temporarily storing transmission data can be reduced. In addition, the transmission data can be divided into buckets that can be stored in the main memory. Moreover, the load processed in each processor can be equalized, thereby contributing to speeding up the process of the parallel processor system.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A parallel processor system for transmitting data from a sender processor to a plurality of receiver processors, comprising:

a plurality of first data memories, included in said sender processor, for temporarily storing data to be transmitted from the sender processor to the plurality of receiver processors and where a number of the first data memories equals a number of the receiver processors; and a plurality of second data memories, formed in each receiver processor of said plurality of receiver processors, for dividing data transmitted from a sender processor and received by the respective receiver processor into a plurality of segments to be processed, and for storing said segments.

2. The parallel processor system as set forth in claim 1, wherein said sender processor includes a main memory and said plurality of first data memories are formed in said main memory of said sender processor, and each receiver processor of said plurality of receiver processors includes a main memory having said plurality of second data memories included the respective receiver processor formed therein.

3. The parallel processor system as set forth in claim 1, wherein said sender processor selects a receiver processor of said plurality of receiver processors to transmit data to, in accordance with a result of a first grouping function applied to data in said parallel processor system.

4. The parallel processor system as set forth in claim 3, wherein processors in said parallel processor system include the sender processor and the plurality of receiver processors, data processed in said parallel processor system is an integer and the first grouping function represents a remainder operation with a prime number exceeding a multiple of the number of processors in said parallel processor system.

5. The parallel processor system as set forth in claim 1, wherein each first data memory of said plurality of first data memories has a threshold value indicating a maximum amount of data to be stored therein, and said sender processor transmits data stored in a respective first data memory of said plurality of first data memories to a corresponding receiver processor when the amount of data stored in the respective first data memory exceeds the threshold value of the respective first data memory.

6. The parallel processor system as set forth in claim 1, wherein a respective receiver processor of said plurality of receiver processors applies a second grouping function to the data transmitted by said sender processor and received by the respective receiver processor, to divide the data transmitted from said sender processor and received by the respective receiver processor into said plurality of segments for processing in the respective receiver processor.

7. The parallel processor system as set forth in claim 6, wherein the sender processor and each receiver processor of the plurality of receiver processors each have a corresponding main memory, data processed in said parallel processor system is an integer and the second grouping function represents a remainder operation with a prime number that exceeds a multiple of a quotient obtained by dividing a total amount of data processed by said parallel processor system by a storage data amount of the main memory of each processor.

8. The parallel processor system as set froth in claim 1, wherein each second data memory of said plurality of second data memories has a threshold value indicating a maximum amount of data to be stored therein, and said sender processor transmits data stored in a respective second data memory of said plurality of second data memories to a secondary memory device when the amount of data stored in the respective second data memory exceeds the threshold value of the respective second data memory.

9. The parallel processor system as set forth in claim 1, wherein the number of first data memories of said plurality of first data memories is at least twice as many as the number of processors in said parallel processor system so that the data to be transmitted from said sender processor is stored while stored data is being transmitted.

10. The parallel processor system as set forth in claim 1, wherein said sender processor selects a receiver processor of said plurality of receiver processors to transmit data to, in accordance with a first result of application of a grouping function for data in said parallel processor system, and the selected receiver processor applies said grouping function for the data transmitted from said sender processor to divide the data transmitted from said sender processor into said segments to be processed in the selected receiver processor, converts the data into one of said segments as a unit for processing in accordance with a second result of application of said grouping function for the data transmitted by said sender processor and received by the selected receiver processor, and stores said segments of the data transmitted by said sender processor and received by the selected receiver processor in each of said plurality of second data memories.

11. A parallel processing method for transmitting data from a first processor to a second processor which is a respective receiver processor of a plurality of receiver processors that receive data transmitted from the first processor, comprising the steps of:

causing the first processor to divide the data to be transmitted into portions equal to a number of receiver processors and in accordance with the plurality of receiver processors and to temporarily store the divided data;

transmitting the divided data to be transmitted from the first processor to the second processor;

causing the second processor to partition the divided data transmitted by the first processor and received by the second processor into corresponding segments to be processed in the second processor and temporarily storing the segments in the second processor; and causing the second processor to process the transmitted data.

12. The parallel processing method as set forth in claim 11, further comprising the steps of:

applying a group function for the divided data transmitted by the first processor and received by the second processor;

converting a result of application of the grouping function into identifiers corresponding to the segments so as to obtain the segments corresponding to the divided data transmitted by the first processor and received by the second processor; and storing the divided data transmitted by the first processor and received by the second processor according to the identifier.

13. A parallel processor system comprising:

a first processor which transmits data and includes a plurality of first data memories for temporarily storing data to be transmitted; and a plurality of receiver processors which receive the data transmitted from the first processor, one of the plurality of receiver processors being defined as a second processor, the first data memories of the first processor corresponding to the plurality of receiver processors, a number of the first data memories equaling a number of the receiver processors, the second processor including a plurality of second data memories for dividing the data transmitted from the first processor and received by the second processor into segments to be processed by the second processor, and for storing the segments.

14. A processor for use in a parallel processor system, said processor receiving data from a sender processor and sending data to a plurality of receiver processors, said processor comprising:

a first data memory having a plurality of data storing areas whose number corresponds to a number of the plurality of receiver processors and temporarily storing data to be transmitted from said processor to the plurality of receiver processors; and a second data memory receiving data transmitted from the sender processor, dividing data transmitted from the sender processor into a plurality of segments to be processed, and storing said segments.

15. A parallel processing method for processing data executed on a parallel computer architecture including a plurality of processors connected by a network enabling transfer of data between the processors, each processor having a local secondary memory, one processor designated as a sender processor sending data to a plurality of receiver processors, said data grouped into a plurality of buckets, a bucket being a collection of data records meaningful to a database, said method comprising the steps of:

a first classification step having a sender processor dividing data by a first grouping function to be transmitted to the receiver processors and putting the data into a plurality of first data memory portions, the first grouping function dividing the data to be transmitted into segment containing data from multiple buckets; and a second classification step at each receiver processor dividing data by a second grouping function partitioning the data transmitted from the sender, and regrouping the data into buckets.

* * * * *